United States Patent
Lelio

(10) Patent No.: US 8,603,274 B2
(45) Date of Patent: Dec. 10, 2013

(54) TIRE RETREADING METHOD AND SYSTEM

(75) Inventor: Luca Lelio, Rome (IT)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 13/384,925

(22) PCT Filed: Jul. 21, 2010

(86) PCT No.: PCT/IB2010/001765
§ 371 (c)(1),
(2), (4) Date: Apr. 13, 2012

(87) PCT Pub. No.: WO2011/010211
PCT Pub. Date: Jan. 27, 2011

(65) Prior Publication Data
US 2012/0193012 A1 Aug. 2, 2012

(30) Foreign Application Priority Data
Jul. 22, 2009 (IT) .............................. TO2009A0554

(51) Int. Cl.
*B29D 30/54* (2006.01)
(52) U.S. Cl.
USPC .................................. 156/96; 156/98; 425/17
(58) Field of Classification Search
USPC ............ 156/96, 98, 379; 152/209.6; 700/110; 73/146; 425/17
See application file for complete search history.

(56) References Cited

U.S. PATENT DOCUMENTS

| | | | |
|---|---|---|---|
| 3,675,375 A | 7/1972 | Enabnit et al. | |
| 4,240,851 A * | 12/1980 | King | 156/96 |
| 4,392,745 A | 7/1983 | Wright et al. | |
| 4,731,136 A | 3/1988 | Risi | |
| 5,238,041 A * | 8/1993 | Tomita et al. | 157/13 |
| 5,695,581 A * | 12/1997 | Lacy | 156/96 |
| 6,251,204 B1 * | 6/2001 | Andersson et al. | 156/96 |
| 6,615,650 B2 * | 9/2003 | Mähner | 73/146 |
| 2005/0230031 A1 | 10/2005 | Nicolas | |
| 2005/0279443 A1 * | 12/2005 | Chapman et al. | 156/96 |
| 2007/0084541 A1 * | 4/2007 | Moriguchi et al. | 156/117 |

FOREIGN PATENT DOCUMENTS

| | | | |
|---|---|---|---|
| JP | 57-110907 | | 7/1982 |
| JP | 01-264607 | * | 6/1989 |
| JP | 11-129343 | * | 5/1999 |
| JP | 2008-128790 | | 6/2008 |
| WO | WO 2009/123610 A1 | | 10/2009 |

OTHER PUBLICATIONS

English language Abstract of JP 01-164607 (original document dated Jun. 1989).*

(Continued)

*Primary Examiner* — Martin Rogers
(74) *Attorney, Agent, or Firm* — Oliff & Berridge, PLC

(57) ABSTRACT

A method and system for retreading a tire, whereby: the worn tread is removed from the tire to expose a lateral surface of a casing; the lateral surface of the casing is skived, thus resulting in the formation of holes and/or craters; a three-dimensional profile of the lateral surface is acquired by a three-dimensional scanner; the locations of the holes and/or craters in the lateral surface are determined by analyzing the three-dimensional profile; cement is only applied at the holes and/or craters in the lateral surface, by supplying the locations of the holes and/or craters to an automatic, electronically controlled applicator; the holes and/or craters are filled with green rubber; a green-rubber cushion and a tread strip are wound about the lateral surface of the casing; and the tire is cured.

3 Claims, 3 Drawing Sheets

(56) References Cited

OTHER PUBLICATIONS

Machine-generated English language translation of JP 11-129343 (original document dated May 1999).*

English language translation of JP 01-164607 (original document dated Jun. 1989).*

International Search Report in International Application No. PCT/IB2010/001765; dated Dec. 6, 2010.

Written Opinion of the International Searching Authority in International Application No. PCT/I132010/001765; dated Dec. 6, 2010.

* cited by examiner

TIRE RETREADING METHOD AND SYSTEM

TECHNICAL FIELD

The present invention relates to a tyre retreading method and system.

The present invention may be used to advantage for retreading truck tyres, to which the following description refers purely by way of example.

BACKGROUND ART

Worn truck tyres are normally retreaded, i.e. the worn tread removed and replaced with a new one. Retreading truck tyres comprises removing the worn tread from the tyre mechanically to expose the casing; applying a new tread to the casing by winding a green-rubber intermediate strip or cushion and a tread strip about the casing; and curing the casing to grip the tread firmly to the casing by means of the bonding action of the cushion.

After removing the worn tread, a lateral surface and/or sidewall of the casing are/is skived manually to remove any existing local damage. This results in the formation of holes and/or craters in the lateral surface of the casing, which, after skiving is completed, are filled manually with green rubber. For the green rubber to grip firmly to the casing, the lateral surface of the casing, before being filled, is sprayed with a liquid (known as cement) comprising green rubber and normalheptane (or other organic solvent), and which serves to prevent detachment of the green rubber from the casing. Statistical studies show that, before being filled, each casing is sprayed on average with roughly 500 grams of cement.

Applying cement has several drawbacks. Being volatile and potentially highly contaminating, cement must be applied in a special cement spray booth, which is bulky, expensive, and normally insulated with rock wool (which involves special, high-cost disposal procedures). Moreover, the cement itself is stored in drums, which also involve special, high-cost disposal procedures; the presence of cement between the casing and the cushion, i.e. of a heterogeneous material between two layers of rubber, may impair performance of the retreaded tyre; and, finally, given the highly contaminating nature of the organic solvents used in cement, avoiding the use of organic-solvent-based cement would greatly reduce the environmental impact of the tyre retreading process as a whole. In this connection, it is important to note that European Union Directive VOC 13/1999/EC calls for a 75% reduction, by the year 2007, in the use of organic solvents in industrial processes with an organic solvent consumption of over 15 tons.

DESCRIPTION OF THE INVENTION

It is an object of the present invention to provide a tyre retreading method and system designed to eliminate the above drawbacks, and which are cheap and easy to implement.

According to the present invention, there are provided a tyre retreading method and system, as claimed in the accompanying claims.

BRIEF DESCRIPTION OF THE DRAWINGS

A non-limiting embodiment of the present invention will be described by way of example with reference to the accompanying drawings, in which.

PREFERRED EMBODIMENTS OF THE INVENTION

Figure 1:
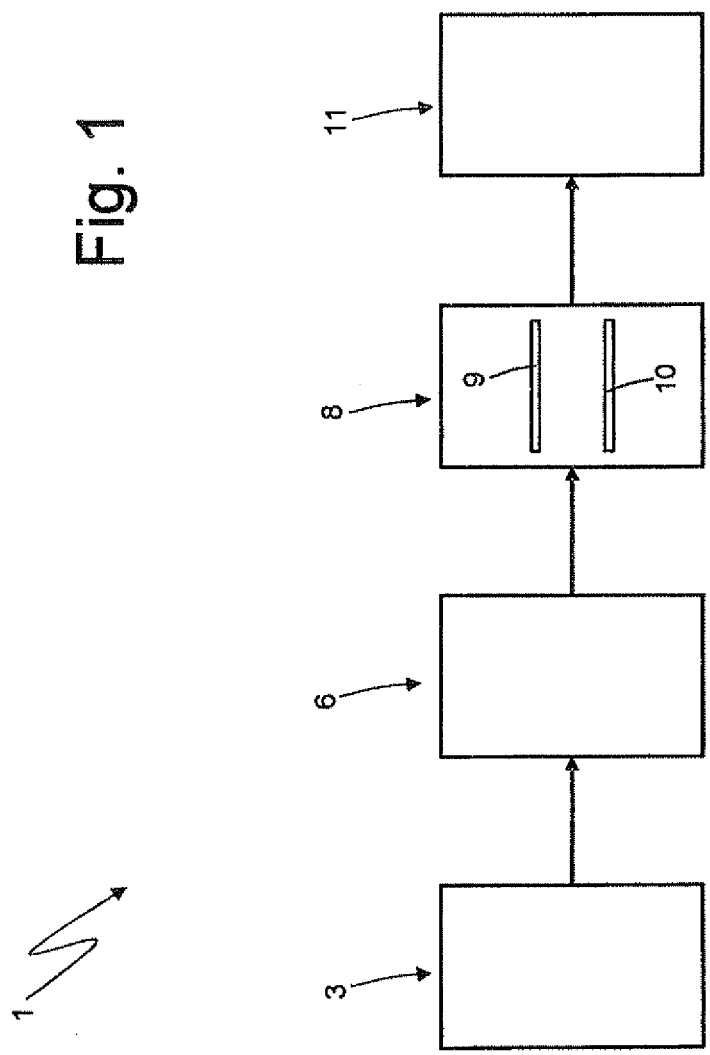
FIG. 1 shows a schematic of a tyre retreading system in accordance with the present invention.
Figure 2:
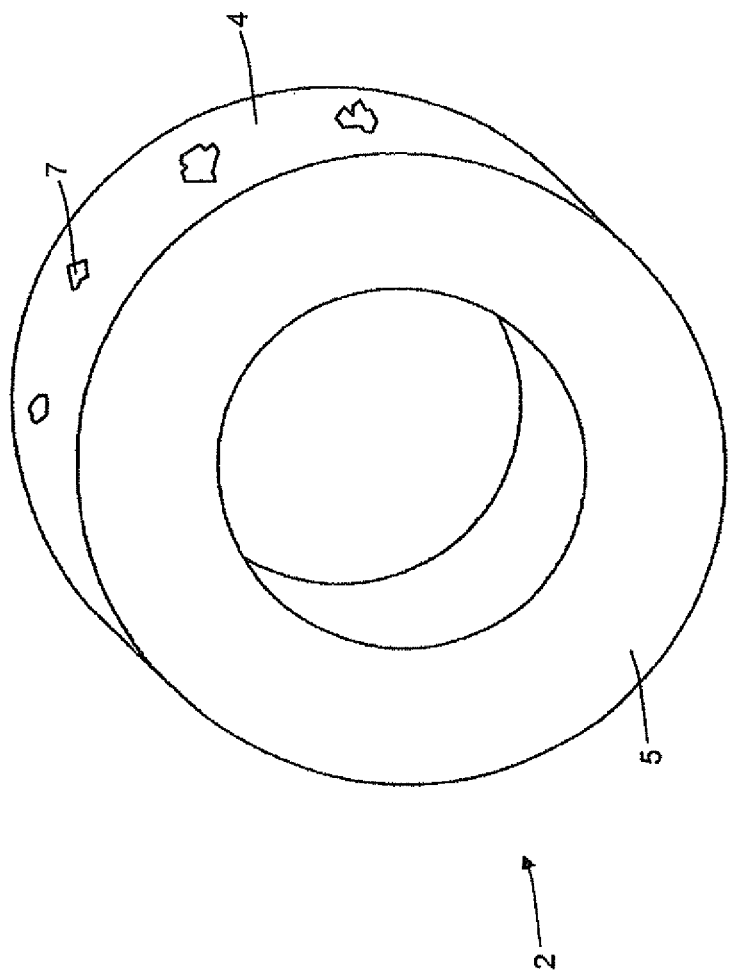
FIG. 2 shows a schematic view in perspective of a tyre processed on the FIG. 1 retreading system.

Number 1 in FIG. 1 indicates as a whole a retreading system for retreading a truck tyre 2 (shown in FIG. 2).

Retreading system 1 comprises a removal station 3, where the worn tread (not shown) is removed mechanically from tyre 2 to expose a lateral surface 4 (shown in FIG. 2 and slightly toroidal in shape) of a casing 5 of tyre 2.

Retreading system 1 also comprises a skiving and filling station 6, where the lateral surface 4 of casing 5 is skived manually to remove any existing local damage. Skiving results in the formation, on lateral surface 4 of casing 5, of holes and/or craters 7 (shown schematically in FIG. 2) varying randomly in size and location, and which are filled manually with green rubber.

Once filled, casing 5 is transferred to a winding station 8, where a green-rubber intermediate strip or cushion 9 and a tread strip 10 are wound about casing 5; and retreading is completed by curing tyre 2 at a curing station 11.

Figure 3:
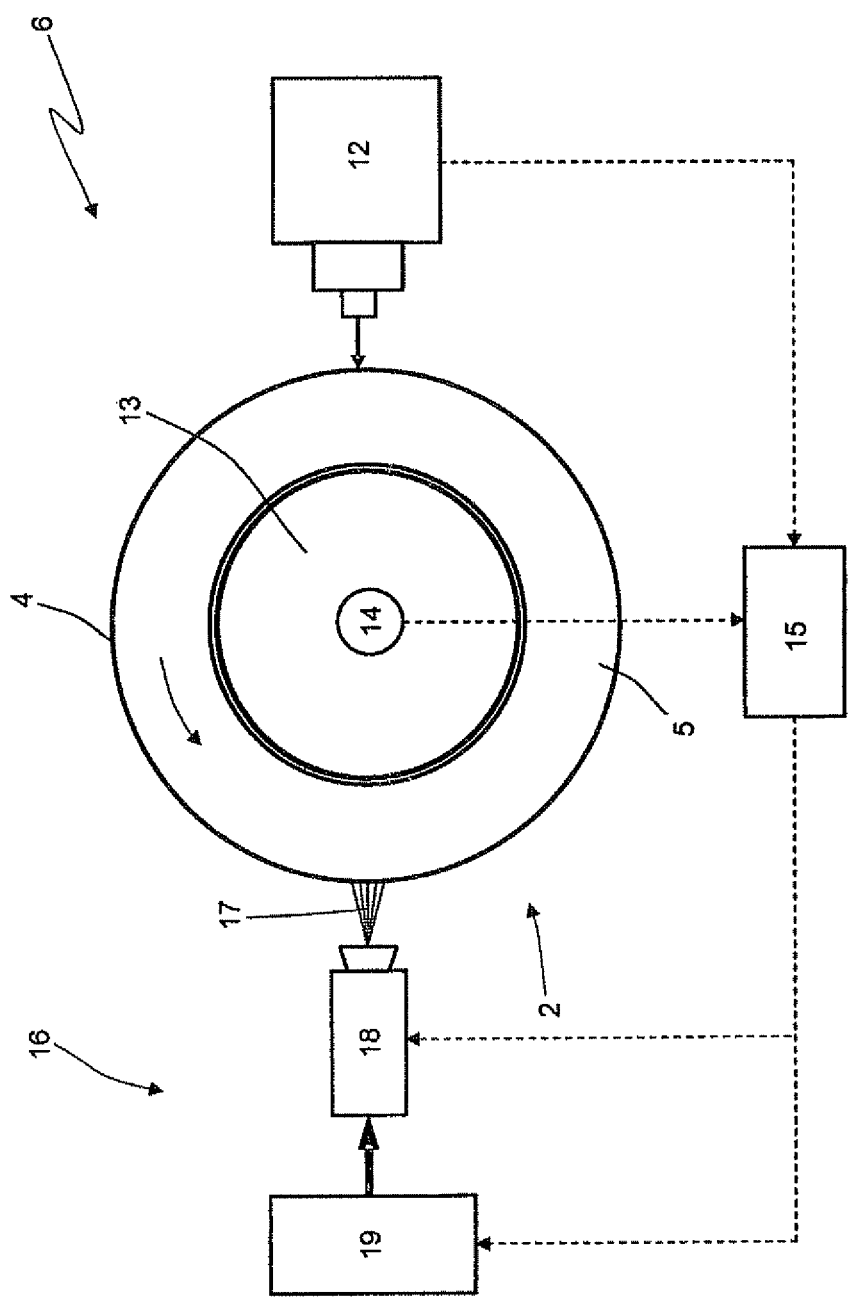
FIG. 3 shows a schematic front view, with parts removed for clarity, of a skiving and filling station of the FIG. 1 retreading system.

As shown in FIG. 3, skiving and filling station 6 comprises a three-dimensional laser scanner 12 positioned facing lateral surface 4 of casing 5 to acquire a three-dimensional profile of lateral surface 4.

In a preferred embodiment, casing 5 is mounted on a powered hub 13 for rotating casing 5 about its longitudinal axis, and which has an angle encoder 14 for real-time measuring the angular position of casing 5. To acquire the three-dimensional profile of lateral surface 4, a control unit 15 controls powered hub 13 to make one full turn of casing 5 (i.e. rotate it 360°); and, at predetermined intervals in the rotation of casing 5 (e.g. every 0.5°, 1°, or 2°), depending on the resolution required, three-dimensional scanner 12 scans lateral surface 4 from shoulder to shoulder to measure the distance between three-dimensional scanner 12 and each point on lateral surface 4 along a line parallel to the longitudinal axis. In other words, to acquire the three-dimensional profile of lateral surface 4 of casing 5, a laser beam emitted by three-dimensional scanner 12 sweeps lateral surface 4 cyclically from shoulder to shoulder as casing 5 is rotated in steps by powered hub 13.

The three-dimensional profile of lateral surface 4 of casing 5 is thus defined by a matrix, which identifies each point on lateral surface 4, and supplies the distance between three-dimensional scanner 12 and each point on lateral surface 4. That is, the three-dimensional profile of lateral surface 4 of casing 5 is defined by a matrix $d(\alpha_i, x_i)$ which gives the distance d between the i-th point on lateral surface 4 and three-dimensional scanner 12, and in which the i-th point on lateral surface 4 is identified by coordinates $\alpha_i$ (indicating the angle of rotation of casing 5 with respect to a reference angle at the i-th point) and $x_i$ (indicating the axial position of the i-th point between the two shoulders of casing 5).

In actual use, control unit 15 is able to determine the location of holes and/or craters 7 in lateral surface 4 of casing 5, by analysing the three-dimensional profile of lateral surface 4. In a preferred embodiment, three-dimensional scanner 12 determines a first three-dimensional profile of lateral surface 4 of casing 5 before it is skived, and a second three-dimensional profile of lateral surface 4 of casing 5 after it is skived, and the locations of holes and/or craters 7 in lateral surface 4 of casing 5 are determined by comparing the second three-dimensional profile with the first three-dimensional profile to determine the geometric discontinuities. That is, a hole and/or crater 7 at a point on lateral surface 4 of casing 5 is identified when the distance between the point and three-dimensional scanner 12 increases significantly (i.e. above a predetermined threshold) after skiving.

Mathematically, the hole and/or crater 7 search is based on the following equations:

$$\Delta_i = D_i(\alpha_i, x_i) - d_i(\alpha_i, x_i)$$

$$\Delta_i > TH?$$

where:

$\Delta_i$ is the change in the distance of the i-th point after skiving;

$D_i$ is the second three-dimensional profile of lateral surface 4 after skiving;

$d_i$ is the first three-dimensional profile of lateral surface 4 before skiving;

TH is the threshold value.

When the change $\Delta_i$ in the distance of the i-th point after skiving is above the pre-settable threshold value, a skiving-generated hole and/or crater 7 is identified at the i-th point.

Skiving and filling station 6 comprises an automatic applicator 16 controlled electronically by control unit 15 to apply cement 17 (i.e. a liquid of green rubber and normalheptane or other organic solvent) to lateral surface 4 of casing 5. Since the function of cement 17 applied to lateral surface 4 is to ensure adhesion of the green rubber used to fill holes and/or craters 7, control unit 15 only applies cement 17 at holes and/or craters 7.

Applicator 16 comprises a spray device 18 controlled by a solenoid valve, in turn controlled by control unit 15, to spray on cement 17 on command; and an electric actuator 19 controlled by control unit 15 and connected mechanically to spray device 18 to move (rotate, translate, or rotate-and-translate) spray device 18 perpendicularly to the longitudinal axis of casing 5.

In actual use, control unit 15 controls powered hub to make one full turn of casing 5 (i.e. rotate it 360°); and, at predetermined intervals in the rotation of casing 5 (e.g. every 2°, 5°, or 10°), depending on the resolution required, applicator 16 is operated, if necessary, to only apply cement at holes and/or craters 7. It is important to note that, because three-dimensional scanner 12 has a much greater resolution than applicator 16, casing 5 is normally rotated in much larger steps when applying cement than when acquiring the three-dimensional profile of lateral surface 4.

The retread method described greatly reduces the amount of cement 17 used preparatory to filling holes and/or craters 7 in lateral surface 4 of casing 5. That is, as opposed to being applied indiscriminately over the whole of lateral surface 4 of casing 5, cement 17 is only applied where it is actually needed, i.e. at holes and/or craters 7 to be filled with green rubber. Theoretical analysis shows that using the retread method described provides for as much as a 95% reduction in consumption of cement 17 when filling lateral surface 4 of casing 5, which means a possible saving of roughly 475 grams of cement 17 for each casing 5.

The invention claimed is:

1. A method of retreading a tire, the method comprising the steps of:
   removing a worn tread from the tire to expose a radially outer surface of a casing of the tire, the radially outer surface possessing areas of local damage;
   creating holes and/or craters in the radially outer surface of the casing by skiving the radially outer surface at the areas of local damage;
   applying liquid cement to the radially outer surface of the casing;
   filling the holes and/or craters in the radially outer surface of the casing with green rubber;
   winding a green-rubber cushion and a tread strip about the radially outer surface of the casing; and curing the tire;
   wherein the step of applying the liquid cement to the radially outer surface of the casing comprises the further steps of:
   determining, before skiving, a first set of distances between a laser scanner and a set of points on the radially outer surface of the casing;
   determining, after skiving, a second set of distances between the laser scanner and the set of points on the radially outer surface of the casing;
   determining the location of the holes and/or craters in the radially outer surface of the casing by comparing the first set of distances with the second set of distances to determine areas of geometrical discontinuities in each of which the compared distances between the radially outer surface and the laser scanner increase after skiving; and
   applying the liquid cement to the holes and/or craters in the radially outer surface of the casing, by supplying the location of the holes and/or craters to an automatic, electronically controlled applicator.

2. A method as claimed in claim 1, wherein the automatic, electronically controlled applicator comprises a spray device for spraying on the liquid cement; and an electronically controlled actuator supporting the spray device.

3. A method as claimed in claim 1, wherein the step of applying cement to the radially outer surface of the casing comprises the further steps of:
   mounting the casing on a powered hub for rotating the casing about its longitudinal axis, and which has an angle encoder for real-time measuring the angular position of the casing;
   placing the laser scanner and the applicator in a respective positions facing the radially outer surface of the casing mounted on the hub; and
   rotating the casing past the laser scanner and the applicator to acquire a three-dimensional profile of the radially outer surface of the casing, and to apply the liquid cement.

* * * * *